US005158782A

United States Patent [19]

Hayashi et al.

[11] Patent Number: 5,158,782

[45] Date of Patent: Oct. 27, 1992

[54] NOODLE MAKING MACHINE

[75] Inventors: Atsuo Hayashi, Gunma; Kazuhiko Takano, Saitama, both of Japan

[73] Assignee: Sanyo Electric Co., Ltd., Osaka, Japan

[21] Appl. No.: 636,032

[22] Filed: Dec. 28, 1990

[30] Foreign Application Priority Data

Dec. 28, 1989 [JP] Japan .................. 1-343851
Dec. 28, 1989 [JP] Japan .................. 1-343855
Dec. 28, 1989 [JP] Japan .................. 1-343856

[51] Int. Cl.[5] .................. B29C 43/58; B29C 43/46; A21C 3/10; A21C 1/00

[52] U.S. Cl. .................. 425/135; 425/200; 425/296; 425/363

[58] Field of Search .................. 425/200, 201, 202, 207, 425/208, 209, 135, 145, 306-308, 363, 367, 377, 296

[56] References Cited

U.S. PATENT DOCUMENTS 1,900,607 3/1933 Kremmling .................. 425/308
2,165,718 7/1939 Mun .................. 425/363
3,280,764 10/1966 Potter et al. .................. 425/308
4,692,107 9/1987 Morikawa et al. .................. 425/145
4,880,371 11/1989 Spinelli et al. .................. 425/145
4,938,605 7/1990 Friedrich .................. 425/209

FOREIGN PATENT DOCUMENTS 60-172264 5/1985 Japan .

*Primary Examiner*—Willard Hoag
*Attorney, Agent, or Firm*—Armstrong, Nikaido, Marmelstein, Kubovcik & Murray

[57] ABSTRACT

A noodle making machine includes a flour storing arrangement, a mixing arrangement to form entangled noodle base by stirring the flour fed from the flour storing arrangement together with kneading water, and a water feeding arrangement to feed kneading water to the mixing arrangement. Also, a noodle-making control arrangement is provided to control the noodle quantity for each meal by keeping constant the feed quantities of the flour and kneading water for unit time, and for changing the feed times.

11 Claims, 13 Drawing Sheets

FIG. 9
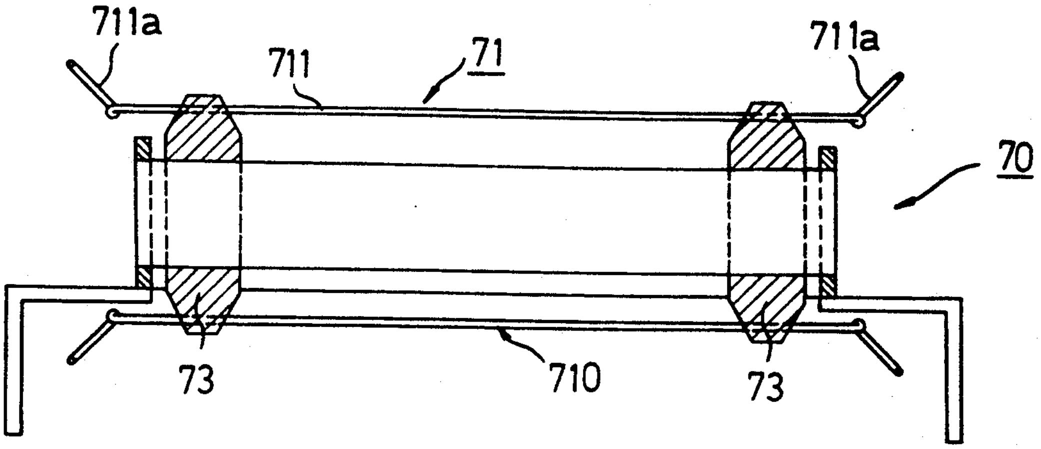
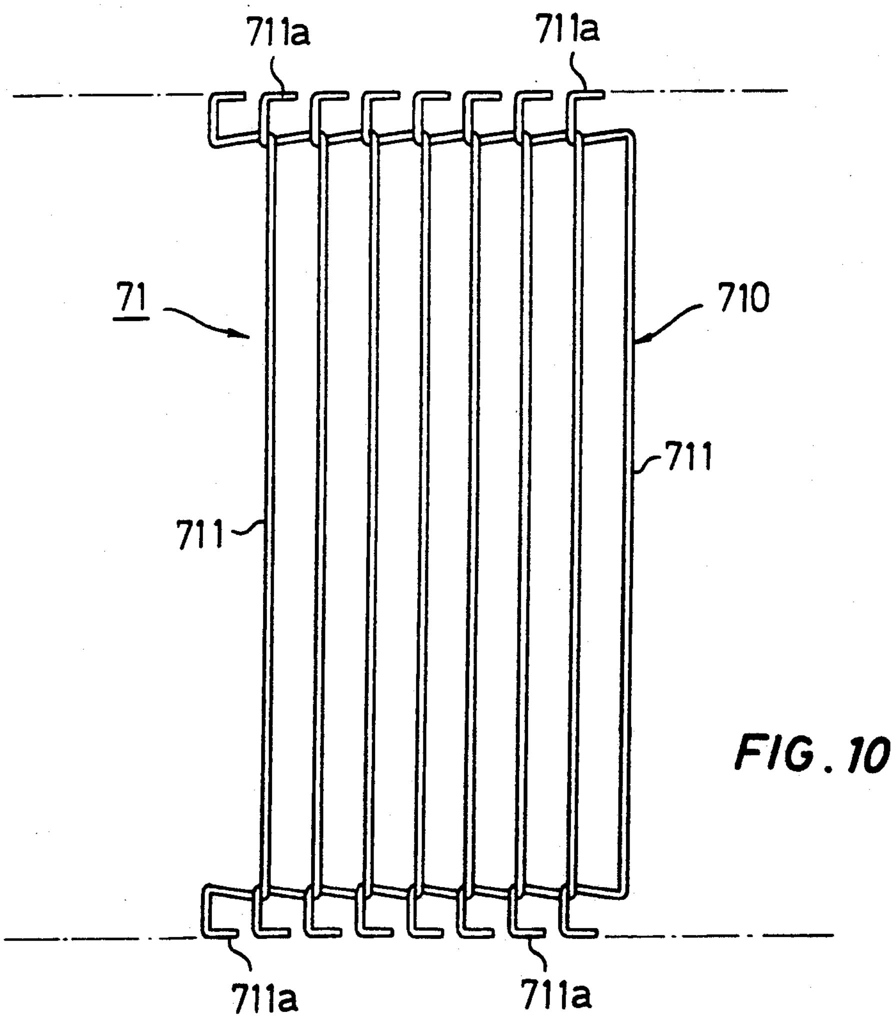
FIG. 10

NOODLE MAKING MACHINE

BACKGROUND OF THE INVENTION (1) Field of the Invention

The present invention relates to a noodle making machine made by improving a means to control the quantity of noodles such as "wheat vermicelli", "buckwheat vermicelli", or "spaghetti".

(2) Prior Art

For the noodle making machine of this type, the quantity of noodles for one meal has been adjusted so far by previously programming the feed time of flour and that of kneading water so that they will be constant and separately changing the feed quantity of flour and that of kneading water. A device of this type is shown in Japanese Patent No. 60-172264.

For the noodle-quantity control system of conventional noodle making machines, however, it is necessary to adjust the feed quantity of flour and that of kneading water by separately measuring the feed quantities. For "wheat vermicelli", for example, it is necessary to adjust the above two feed quantities so that the ratio of the former to the latter will be 10:4. Therefore, much time and labor are necessary for adjustment. In this case, it is also considered to manually adjust the feed quantities of flour and kneading water while checking the state of actually-made noodles without measuring the feed quantities. In this case, however, much flour is wasted during adjustment of the quantities.

To set a "large serving" for example, there is a problem that a mixer is easily clogged with kneaded flour because the mixer capacity is constant if noodle quantity is greatly increased.

OUTLINE OF THE INVENTION

It is an object of the present invention to make it possible to automatically and easily change the noodle quantity for one meal without separately adjusting the feed quantity of flour and that of kneading water and also easily remote-control the noodle quantity for one meal by means of the system comprising a flour storing means, a mixing means to produce entangled noodle base by stirring flour and kneading water fed by the flour storing means, a water feeding means to feed kneading water to the mixing means, a noodle-making control means to make noodles by controlling the feed quantities of flour and kneading water every unit for one meal, and a controlling means to allow the noodle quantity for each meal to be controlled by setting the feed quantities of said flour and kneading water for unit time to a constant value and changing the feed time.

It is another object of the present invention to make it possible to easily clean the machine and keep it clean through the flour storing means comprising a hopper housing fine particles such as flour, a base removably installed at the bottom of the hopper through a partition to separate a top storing section from a lower one, and a fine-particle volumetric feeder removably assembled in the base and to feed a certain volume of fine particles fed from said hopper to the bottom storing section through several openings installed on said partition, wherein said fine-particle volumetric feeder has a rotary plate in which several constant-volume measures to house a certain volume of fine particles fed to said bottom storing section are installed on the circumference corresponding to the openings at the bottom of said base at an equal interval; a rotary body installed to synchronously rotate the rotary plate, provided with several rotary fingers protrusively installed on the circumference so that each of said measures will be present between the fingers, and rotated by the driving motor installed at the bottom of said base; and several stirring rods which are synchronously-rotatably installed on the top of the rotary body so that they will be protruded on the top circumference of the rotary body to appear in the top storing section of the hopper through said partition.

To quantitatively feed fine particles, rotation of the rotary plate is controlled so that the fine particles housed in said measures will naturally be dropped from the openings according to the number of measures on the rotary plate corresponding to that of openings. Therefore, the variation of feed quantity due to difference between types of fine particles or that between machines can be decreased and the feed quantity of fine particles can quantitatively controlled because the variation of feed quantity due to difference between machines decreases.

It is other object of the present invention to make it possible to easily open the milling portion between rollers and easily clean the milling portion by means of the system comprising a flour storing means, a mixing means to produce entangled noodle base by stirring the flour and kneading water quantitatively fed from the flour storing means with a mixer, a milling means to make a noodle band by feeding the entangled noodle base produced by the mixing means to a pair of pressure rollers, an opening means to open the milling portion between said pressure rollers by securing the shaft of one of the counterpart rollers composing the milling means to a fixed support frame and the other to a rotary support frame rotatably installed so that it will be separated from one of said pressure rollers and rotating the rotary support frame, a cutting means to cut the noodle band made by said milling means into noodle lines by feeding it to a pair of cutting-edge rollers, and a sending means to send the noodle lines cut by the cutting means by dropping them onto a conveyer. Also, the noodle base loss due to dropping of noodle base can securely be prevented by setting the shaft fulcrum of said rotary support frame and that of other pressure roller supported by the rotary support frame to different positions so that the other pressure roller will contact one pressure roller.

Moreover, the gap of the milling portion can easily be adjusted by one adjusting member and the structure can also be simplified by locking said rotary support frame with a locking lever, installing an adjusting member to control the rotatable range of the rotary support frame on the locking lever, giving a gap to the milling portion where two rollers contact so that the gap will be kept by the load for milling of the entangled noodle base fed by the mixing means, and controlling the noodle band thickness. Said milling means makes it possible to stably and smoothly separate a noodle band from the pressure roller surface and produce high-quality noodle band with smooth surface by pressing each end of the first and second scraper against the upward side of the milling portion of the pressure roller pair and installing the end of the first scraper at a high position close to said milling portion and that of the second scraper at a position lower than the first scraper position so that they will be asymmetric to the central axis of said milling portion.

Moreover, the pressure to the pressure rollers can be increased by applying plasma nitriding to the pressure roller surface so that each scraper can use stainless steel with high stiffness. In addition, said sending means is configured by uniting a guide frame, a conveyer installed along the longitudinal direction of the guide frame, and a sprocket installed on one end and/or both ends of the portion in the machine body where the longitudinal side of said guide frame directly connected to the conveyer to transmit power is installed, and removably engaging the driving sprocket with the driving sprocket installed in the machine body. Therefore, the conveyer and its accessories in the machine can easily be cleaned so that the machine will be kept clean.

Also, by making said conveyer into an endless belt consisting of many wires arranged at the interval equal to the pitch of the driving sprocket, noodle pieces drop under the sending unit from the gap between wires. Therefore, noodle pieces are prevented from moving into the oven and hot water in the oven can be kept clean.

Furthermore, by folding the both ends of each wire composing said conveyer upward in the transverse direction so that they will serve as a guide wall, the conventional guide wall made of a guide frame is unnecessary.

BRIEF DESCRIPTION OF THE DRAWINGS

FIG. 9 is a sectional view taken on the line IX—IX in FIG. 8.

FIG. 10 is an enlarged top view schematically showing a part of the conveyer.

DETAILED DESCRIPTION OF THE PREFERRED EMBODIMENT

The following is the detailed description of concrete aspects of the noodle making machine of the present invention according to the embodiments shown in FIGS. 1 through 14.

Figure 1:
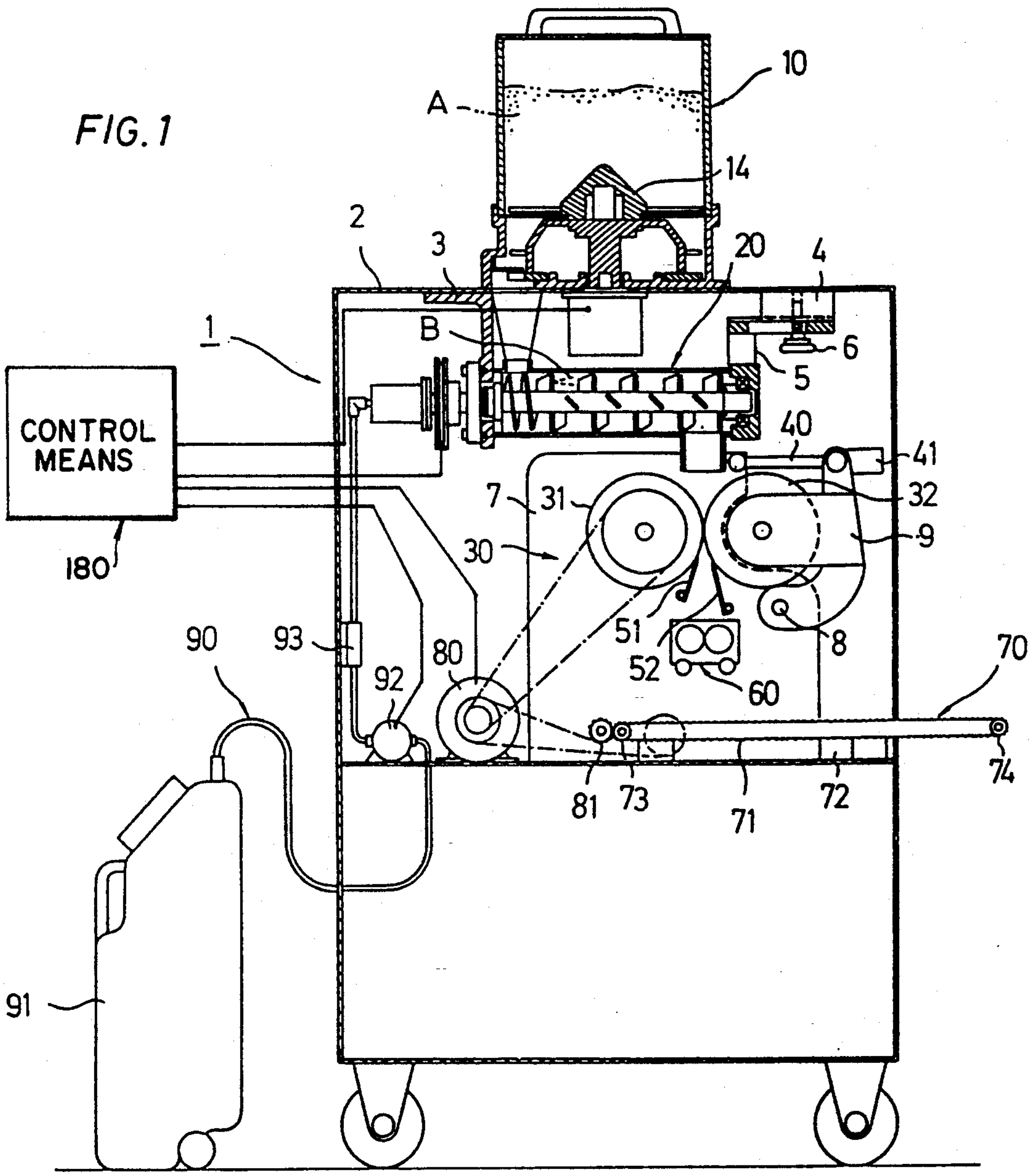
FIG. 1 is a schematic sectional view showing the entire configuration of the noodle making machine according to the present invention.

FIG. 1 schematically shows the entire configuration of the noodle making machine of the present invention, in which the number 1 represents the machine body.

The flour storing section 10 to be mentioned later as a flour storing means to store the flour A is installed on the top board 2 of the machine body 1 and the mixer 20 as a mixing means is installed at the top of said machine body 1 located under the flour storing section 10.

The mixer 20, as mentioned later, is removably held by the brackets 3, 4, and 5 with the securing screw 6 to produce entangled noodle base by stirring the flour A quantitatively fed from said flour storing section 10 together with the kneading water B.

In FIG. 1, the number 30 represents a milling system as a milling means installed under said mixer 20.

Figure 6:
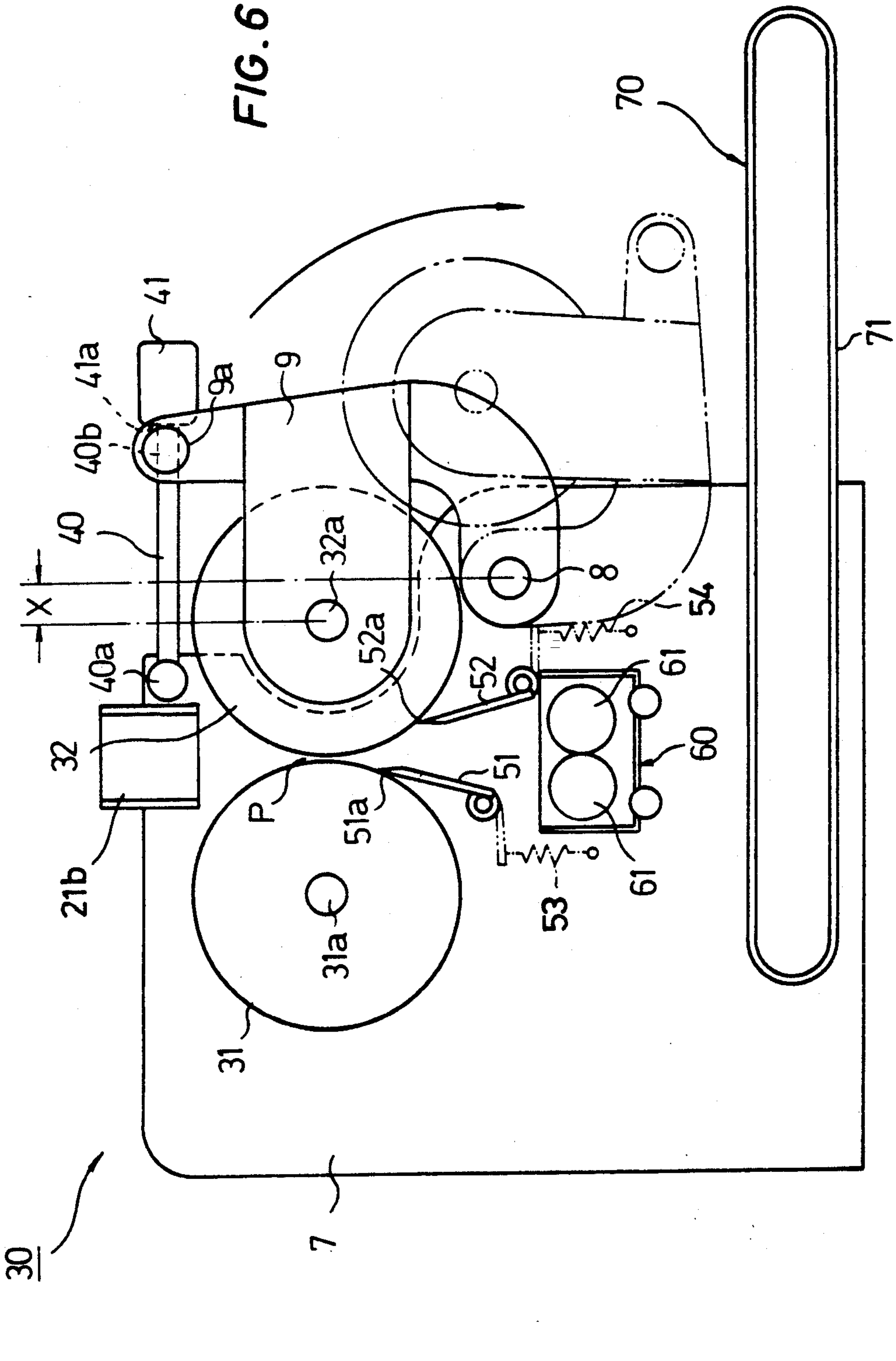
FIG. 6 is an enlarged explanatory drawing schematically showing the milling system built in the noodle making machine.

The milling system 30, as shown in FIG. 6, comprises a pair of milling rollers 31 made by applying plasma nitriding to the surface of a hard roller made of iron or stainless steel.

The support shaft 31*a* of one milling roller 31 of the pair is supported by the fixed support frame 7 secured to said machine body 1 and the support shaft 32*a* of the other milling roller 32 is supported against said milling roller 31 by the rotary support frame 9 so that it can be rotated in the longitudinal direction around the shaft 8.

Said milling roller 32, as shown by a two-dot chain line in FIG. 6, opens the milling portion P between said rollers 31 and 32 by rotating the rotary support frame 9 backward.

The shaft fulcrum 8 of said rotary support frame 9 is located at the position which is "X" apart from the milling roller 32 supported by the rotary support frame 9 so that it will be behind said milling roller 31. Therefore, the milling roller 32 is constantly pressed against the milling roller 31 by its own weight.

In this embodiment, the milling roller 32 is pressed against the milling roller 31 by its own weight. However, it is also possible to press the milling roller 32 against the milling roller 31 through the force of a spring instead of its own weight. In FIG. 1, the number 40 represents a locking lever to lock said rotary support frame 9 at the side of the machine body 1. One end 40*a* of the locking lever 40 is supported by said fixed support frame 7 so that it can be rotated upward and downward. At the other end 40*b* of the locking lever 40, the noodle-thickness adjusting dial 41 is screwed as an adjusting member. The noodle-thickness adjusting dial 41 can be moved in the direction of the shaft of said locking lever 40 by turning the dial.

Said rotary support frame 9 is locked by securing the end 41 of the noodle-thickness adjusting dial 41 to the securing shaft 9*a* at the end of said rotary support frame 9. Under the above locking state, the longitudinally-rotating range of said rotary support frame 9 can be controlled by turning the noodle-thickness adjusting dial 41.

That is, the entangled noodle base produced by said mixer 20 is fed between said pair of milling rollers 31 and 32 to form a noodle band.

Meanwhile, said noodle-thickness adjusting dial 41 makes it possible to control the noodle band thickness at one place by storing a certain amount of the entangled noodle base fed from said mixer 20 in the milling portion P between the rollers 31 and 32 contacting with each other, allowing said rotary support frame 9 to rotate backward up to a certain range so that the milling roller 32 will be separate from the milling roller 31 by the weight of the stored noodle base under milling, and keeping the gap of the milling portion P constant.

In FIG. 1, the numbers 51 and 52 represent the first and second scrapers made of stainless plate installed under said pair of milling rollers 31 and 32.

The ends 51a and 52a of said scrapers 51 and 52 are pressed against said milling rollers 31 and 32 respectively without gap. The end 51a is set to a higher position close to the milling portion P between said milling rollers 31 and 32 and the end 52a is set to a position lower than the end 51a. The ends 51a and 52a are asymmetrically arranged so that each noodle removing timing will be different.

That is, by asymmetrically arranging the ends 51a and 52a of said scrapers 51 and 52, the noodle band attached to the surfaces of the milling rollers 31 and 32 is first removed from the surface of the milling roller 31 by the end 51a of the first scraper 51 closer to the milling portion P and then removed from the surface of the milling roller 32 by the end 52a of the second scraper 52. Thus, the noodle band is stably and smoothly removed at different timings.

That is, by setting said first scraper 51 and second scraper 52 to vertically different positions, the end 51a of the first scraper 51 can be more closely brought to the milling portion P. Therefore, a noodle band can be removed from the milling roller 31 by the end 51a of the scraper 51 before it is pulled by said milling rollers 31 and 32. Thus, the noodle band is smoothly removed from the milling rollers 31 and 32.

Figure 2:
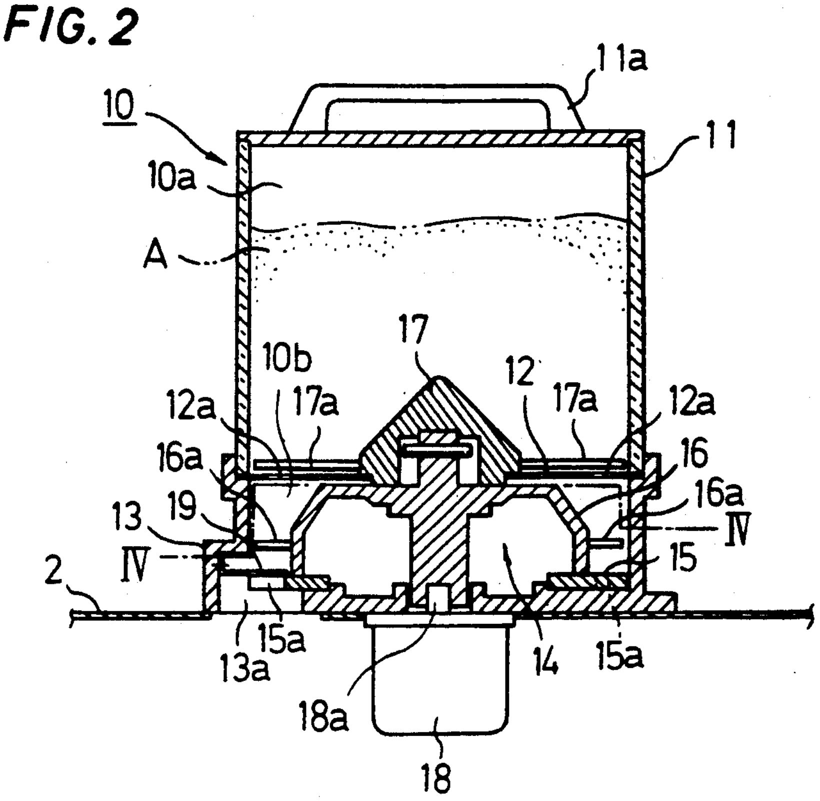
FIG. 2 is an enlarged sectional view of the flour storing section built in the noodle making machine.
Figure 3:
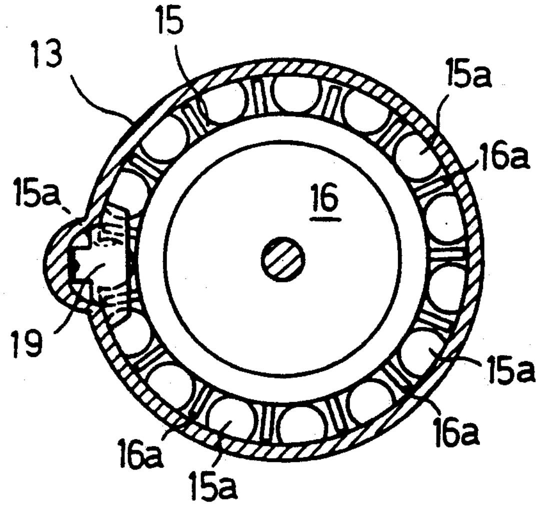
FIG. 3 is a transverse sectional view taken on the line III—III in FIG. 2.
Figure 4:
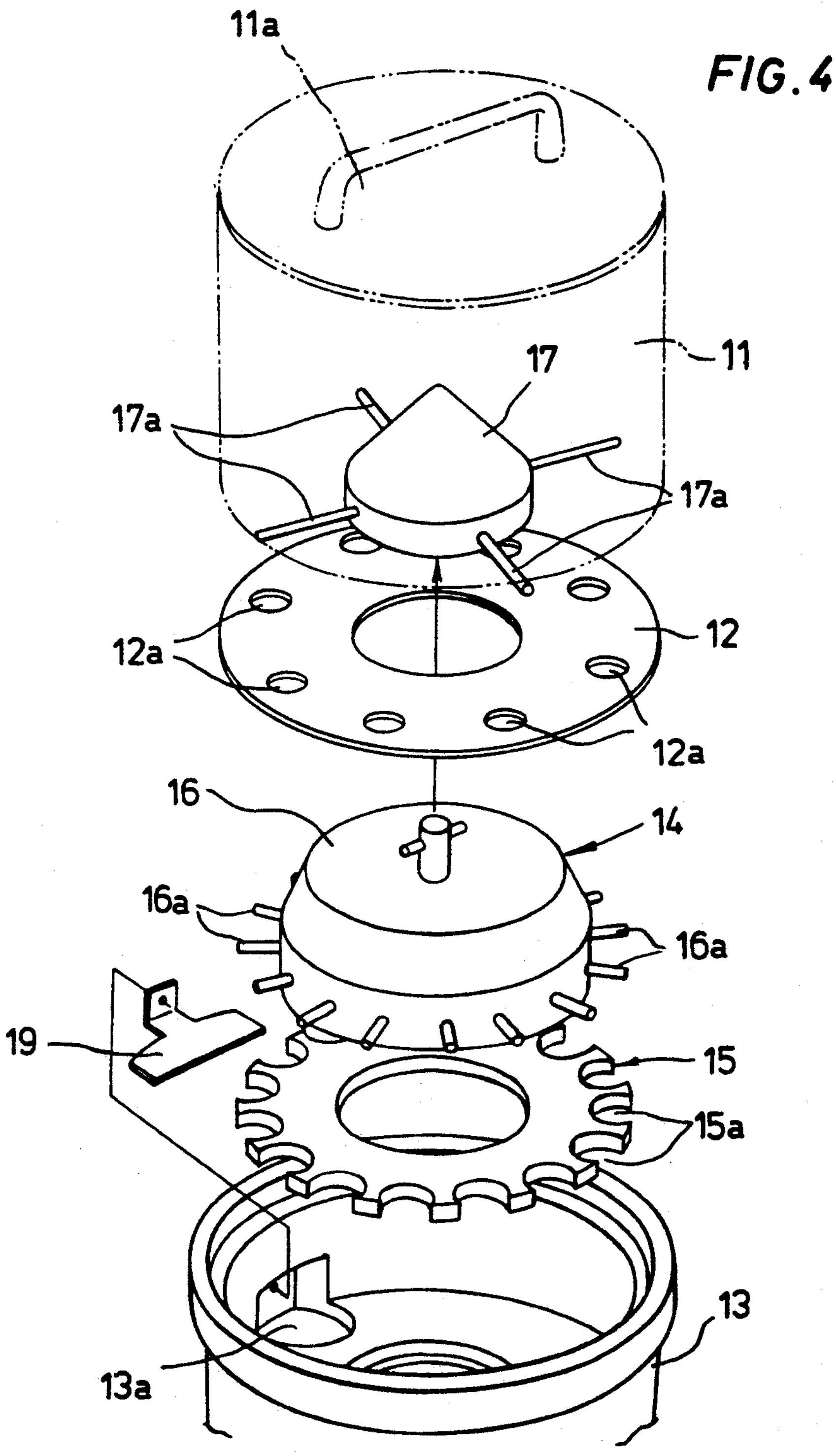
FIG. 4 is an exploded perspective view of the flour storing section.

The flour storing section 10 as said flour storing means, as shown in FIGS. 2 through 4, is composed of the transparent cylindrical hopper 11 with its top opening covered by the lid 11a, the base 13 by which the hopper 11 is supported through the partition 12, and flour volumetric feeder 14 installed in the base 13 so that the storing section 10 can be disassembled. Said partition 12 is secured between said hopper 11 and base 13 to divide the storing section into the top storing section 10a and the bottom storing section 10b so that the weight of the flour A stored in the top storing section 10a will be applied to the bottom storing section 10b to prevent the density of the flour A from changing. On the periphery of the partition 12, several openings 12a . . . are made to drop the flour A stored in said top storing section 10a into the bottom storing section 10b.

The flour volumetric feeder 14 is composed, so that it can be disassembled, of the rotary plate 15 which freely moves on the bottom in said base 13 and has several constant-volume measures 15a . . . (15 measures in the illustrated embodiment) formed by notching the plate 15 at equal intervals along its circumference, the rotary body 16 which is installed on the rotary plate 15 so that it will rotate synchronously with the plate 15 and has protruded rotary fingers 16a . . . so that each finger will be located between measures 15a . . . on its periphery, the stirring body 17 which is installed on the top of the rotary body 16 so that it will rotate synchronously with the body 16 and has several stirring rods 17a (four rods in the illustrated embodiment) on its circumference so that they will appear in the bottom surface of the top storing section 10a of said hopper 11 through said partition 12, and the driving motor 18.

The driving shaft 18a of the driving motor 18 is connected to said rotary body 16 to synchronously rotate said rotary plate 15 and stirring body 17 through the rotary body 16.

Said stirring body 17 rotates to stir the flour A stored in the top storing section 10a of said hopper 11 and drop the flour into the bottom storing section 10b without clogging the opening 12e of the partition 12 with the flour. The flour A dropped into the bottom storing section 10b accumulates on said rotary plate 15 so that it will be stored in each of the measures 15a . . .

The rotary fingers 16a . . . protruded on the circumference of said rotary body 16 stir the flour A dropped into and accumulated on the bottom storing section 10b so that it will not slip relative to the rotary plate 15 and also to release air.

When one of the measures 15a . . . corresponds to the dropping port 13a opened at the bottom in said base 13 through as the result of rotation of the rotary plate 15, the flour A stored in each of the measures 15a . . . of the rotary plate 15 drops from the measure 15a by its own weight and is fed to said mixer 20.

In this case, the feed quantity of the flour A to said mixer 20 can be set by increments of the quantity of the flour A stored in one constant-volume measure 15a and according to the number of measures 15a corresponding to the dropping port 13a as the result of rotation of the rotary plate 15.

Therefore, the required quantity of the flour A can be fed to the mixer 20 by setting the rotation time of the rotary plate 15 and successively bringing the required number of measures 15a to the position corresponding to said dropping port 13a.

As another method, the required quantity of the flour A can be fed to the mixer 20 by detecting the movement of the measure 15a according to rotation of the rotary plate 15 with a sensor (not illustrated) and setting the number of measures 15a corresponding to the dropping port 13a. A control means 180 is schematically shown in FIG. 1, for controlling the mixer 20, the motor 18, the driving motor 80, and the pump 92.

In the figure, the number 19 represents a shielding plate installed at the position corresponding to the dropping port 13a opened at the bottom in said base 13. The shielding plate 19 contacts the top surface of the measure 15a of the rotary plate 15 to prevent the flour A stored in said bottom storing section 10b from dropping from the dropping port 13a.

Figure 5:
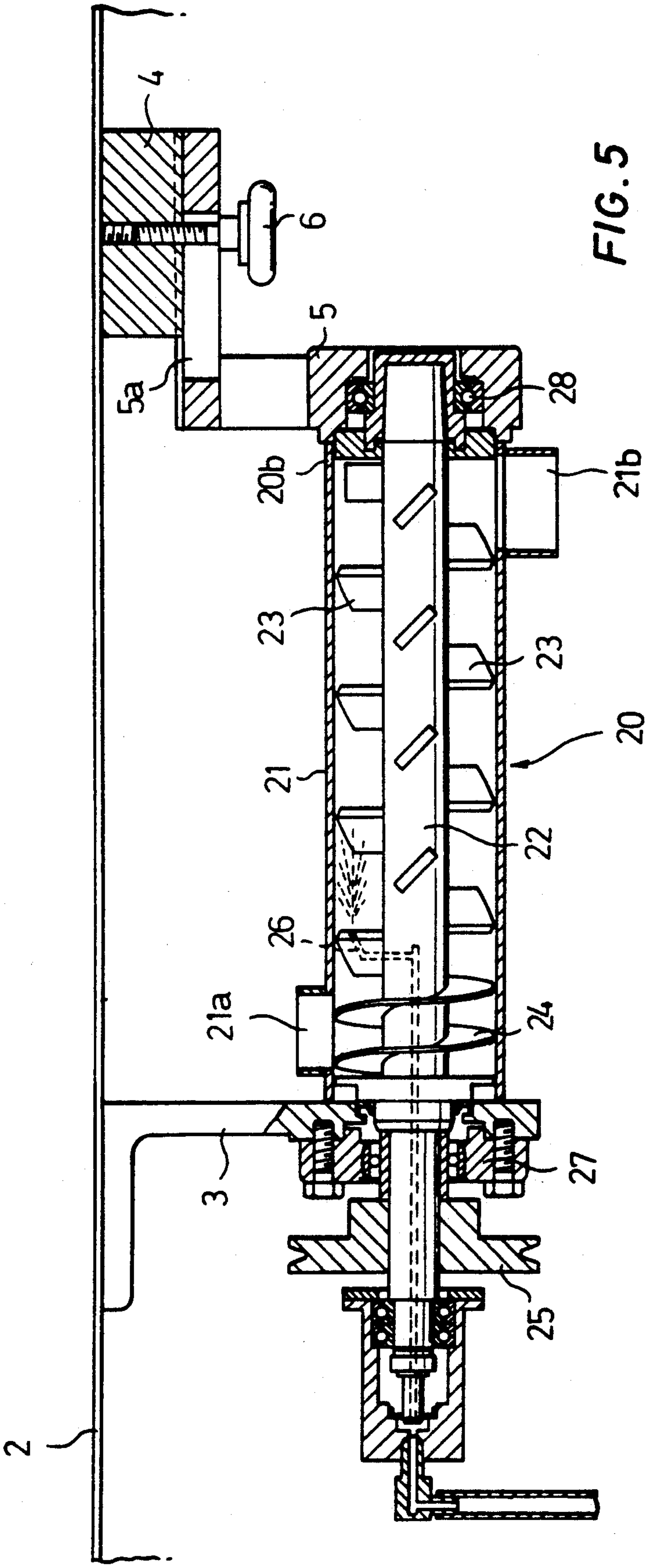
FIG. 5 is an enlarged sectional view of the installed mixer.

Meanwhile, as shown in FIG. 5, the mixer 20 is composed of the cylindrical case 21 having the flour-A feed port 21a at the top of one side and the ejection port 21b to eject the entangled noodle base produced by the mixer 20 at the bottom of the other side, the rotary shaft 22 inserted into the case 21 in the shaft direction, several stirring blades 23 . . . installed on the rotary shaft 22, the spiral section 24 installed at the position adjacent to the stirring blades 23 . . . and corresponding to said feed port 21a, the driving pulley 25 to drive said rotary shaft 22 with a driving system (not illustrated), and the nozzle 26 to jet the kneading water B into said case 21. Said nozzle 26 is connected to the water feeder 90 to be mentioned later.

The rotary shaft 22 and the stirring blades 23 . . . composing said mixer 20 are formed together by aluminum casting. However, the spiral section 24 which is hardly casted is made of stainless steel and fitted into said rotary shaft 22.

That is, one end of the case 21 corresponding to one end 20a of the mixer 20 is inserted into and held by the first fixed bracket 3 secured on the back of the top board 2 of said machine body 1 through the bearing 27, while the other end of the case 21 corresponding to the other end 20b of the mixer is inserted into and held by the movable bracket 5 having the guide hole 5a secured to the second fixed bracket 4 with the screw 6 through the bearing 28 and removably hung in the dead space at the back of the top board 2 of said machine body 1.

Therefore, the milling system 30 can easily be cleaned because the top of the milling system 30 built in said machine body 1 is open through the above configuration.

Also for said milling system 30, as shown in FIG. 6, the milling portion P can easily be opened because the support shaft 31*a* of the milling roller 31 is supported by the fixed support frame 7, the milling roller 32 is supported by the rotary support frame 9 which can longitudinally be rotated for the milling roller 31, and the milling portion P between said rollers 31 and 32 is opened according to backward rotation of the rotary support frame 9.

Moreover, the noodle base loss due to dropping of noodle base can completely be prevented because the positions of the shaft fulcrum 8 of said rotary support frame 9 and the shaft fulcrum 32*a* of the milling roller 32 supported by the rotary support frame 9 are different by a distance "X" so that the milling roller 32 will constantly be pressed against the milling roller 31 by its own weight.

Furthermore, the noodle band thickness can accurately and simply be controlled at one place because said rotary support frame 9 is locked by the locking lever 40, the noodle-thickness adjusting dial 41 to control the longitudinally-rotatable range of said rotary support frame 9 is installed on the locking lever 40, and the milling portion P between rollers 31 and 32 which contact with each other by the weight of the roller 32 is set so that a required gap will be maintained by the weight of the entangled noodle base during milling.

Also, by allowing the milling portion P to be easily opened, the diameters of the milling rollers 31 and 32 can be increased and the distance between the rollers 31 and 32 can be increased.

Therefore, the storing quantity of noodle base fed from the mixer 20 increases and noodles are not cut because the noodle base is smoothly drawn.

In this case, the noodle making time is shortened and noodles are not cut by properly setting the speed and diameter of the milling roller pair and the gap of the milling portion according to the viscosity of the noodle base.

Figure 7:
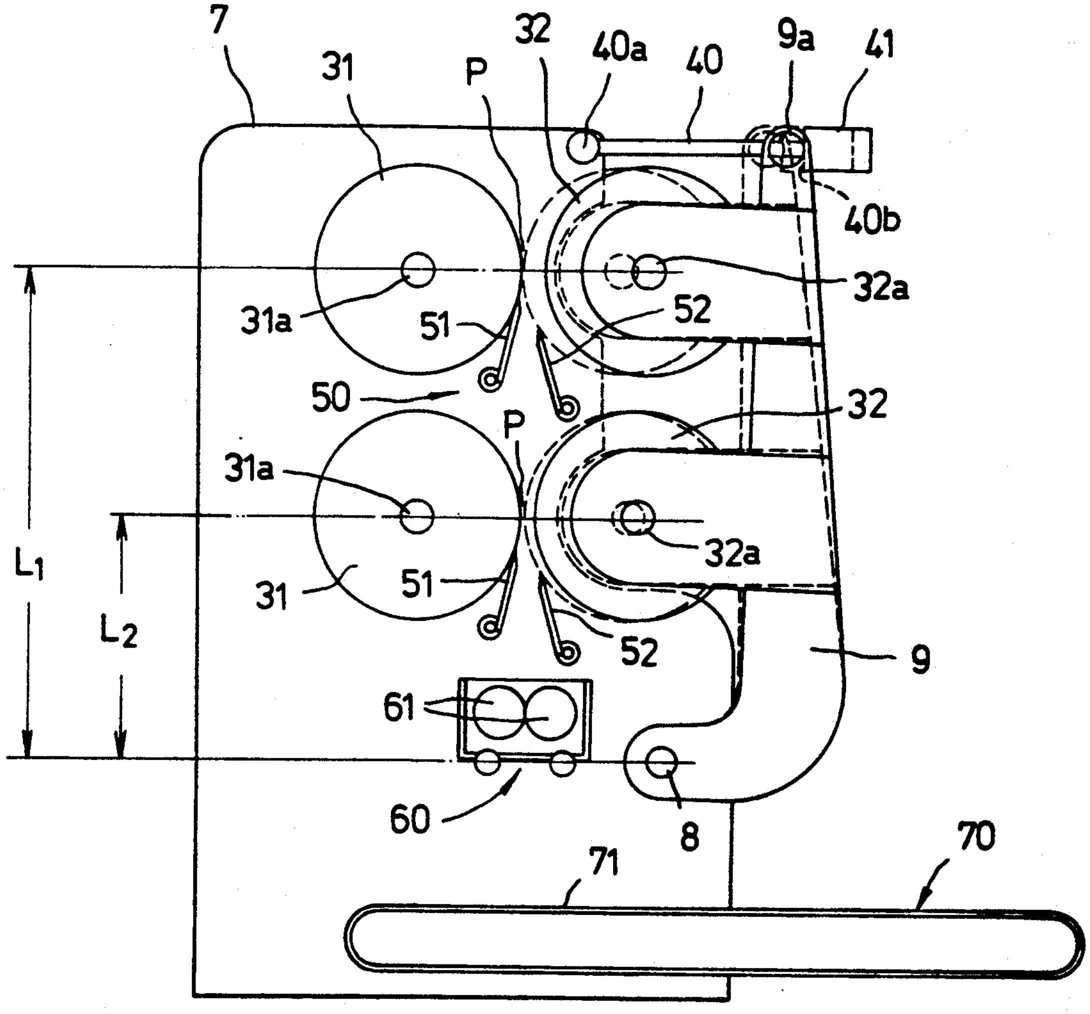
FIG. 7 is an enlarged explanatory drawing showing a other embodiment of the milling system according to the present invention.

Though the above embodiment is described by taking the one-stage milling system 30' as an example, the two-stage milling system 30 shown in FIG. 7 is also possible.

In this case, the distance L1 between the shaft fulcrum 32*a* of the top-stage pairing roller 32 at the side of the rotary support frame 9 and the shaft fulcrum 8 of the rotary support shaft 9 is set to double of the distance L2 between the shaft fulcrum 32*a* of the bottom-stage pairing roller 32 and the shaft fulcrum 8 of the rotary support frame 9.

According to the above configuration, the interval between the top-stage milling rollers 31 and 32 and that between the bottom-stage milling rollers 31 and 32 change at the ratio of "2:1" by rotating the rotary support frame 9.

By setting the ratio between the speed of the top-stage milling rollers 31 and 32 and that of the bottom-stage milling rollers 31 and 32 to "1:2", the gap of the milling portion P between the milling rollers 31 and 32 can constantly be kept at a proper value.

In FIG. 7, the number 60 represents a cutting means to cut the noodle band milled by said milling system 30 into noodle lines by feeding it to a pair of cutting-edge rollers 61 and 62, the number 70 a sending means to send the noodle lines cut by the cutting means 70 through the conveyor 71, the number 80 a driving motor to drive the sending means 70 and the milling rollers 31 and 32 of the milling system 30, and the number 90 a water feeder to feed the kneading water B to said mixer 20.

The water feeder 90 feeds the kneading water B stored in the water tank 91 to said mixer 20 through the pump 92 and flow regulator 93.

Figure 8:
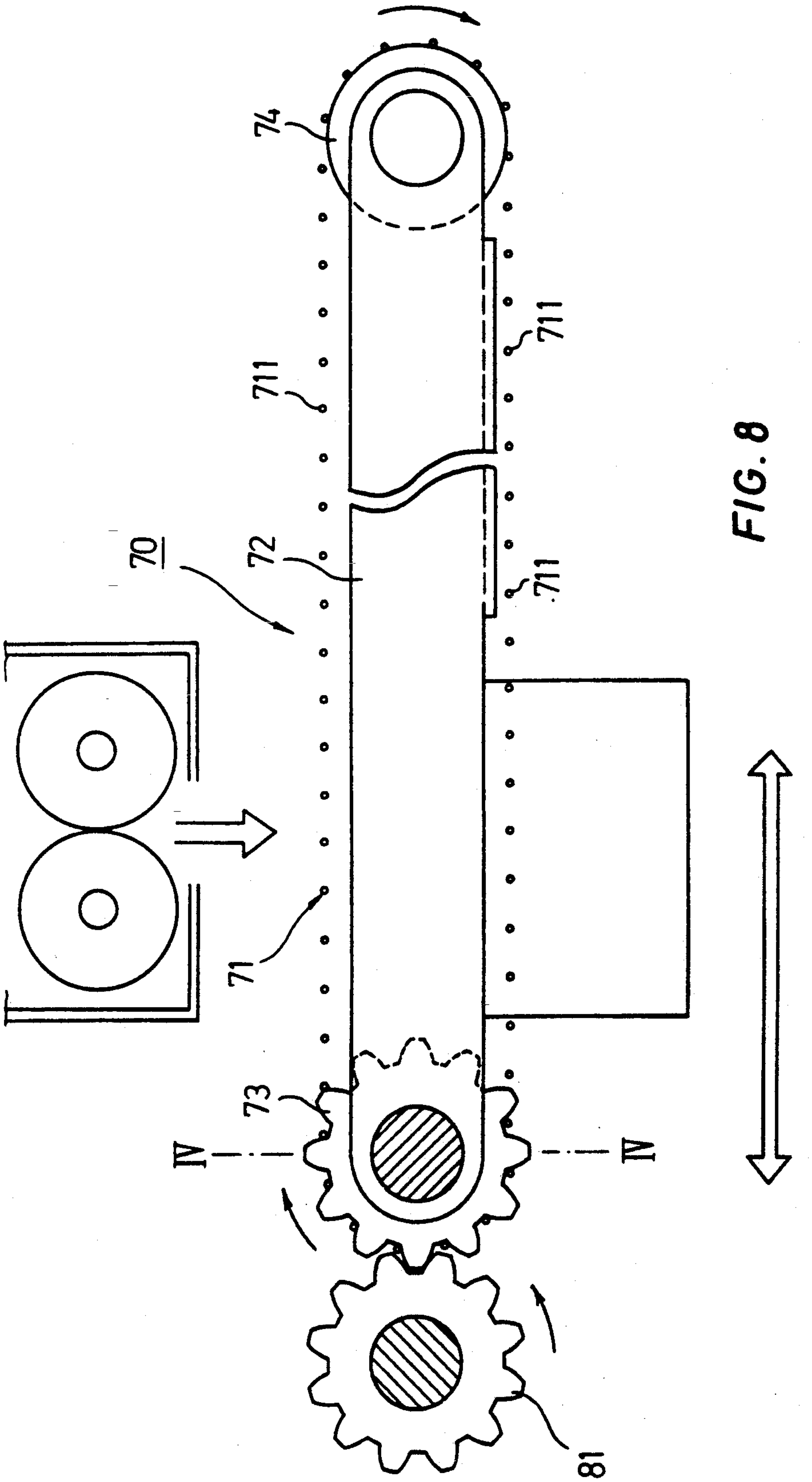
FIG. 8 is an enlarged explanatory drawing showing the united sending means built in the noodle making machine.

Said sending means 70, as shown in FIGS. 8 through 10, is united by the guide frame 72, the driving sprocket 73 and the driven sprocket 74 made of polyacetal resin installed at the front and rear ends in the longitudinal direction of the guide frame 72, and the conveyer 71 connecting said driving sprocket 73 and said driven sprocket 74 so that power will be transmitted by directly engaging said conveyer 71 with said driving sprocket 73.

The united sending means is installed in said machine body 71 with the thumbscrew 712 and so on (which can be turned by fingers) at the bottom of the guide frame 72 and driven by directly engaging the driving sprocket 73 at the installation end with the driving sprocket 81 interlocking with the driving motor 80.

Said conveyer 71 is composed of the endless belt 710 consisting of many wires 711 . . . arranged at the interval equal to the pitch of said driving sprocket 73, whose guide wall is formed by folding the transverse both ends 711*a* of the wires 711 upward.

Thus, the conveyer and its accessories in the machine body 1 can easily be leaned by removing the sending unit because said united sending means 70 is removably installed in the machine body 1. Because the conveyer 71 is composed of the endless bent 710 consisting of many wires 711 arranged at the interval equal to the pitch of the driving sprocket 73, noodle pieces drop under the sending unit from each gap between wires 11. Therefore, they are prevented from entering the oven.

Moreover, because the guide wall is formed by folding the transverse both ends 711*a* of each wire 711 forming the conveyer 71 upward, it is unnecessary to install the conventional guide wall formed by raising the both side plates of the guide frame 72.

Furthermore, the number of parts can be decreased because the power of the conveyer 71 is transmitted by directly engaging the driving sprocket 73 with the conveyer 71.

In the above embodiment, the conveyer 71 composing the sending means 70 is set between the driving sprocket 73 and the driven sprocket 74 so that it will directly be engaged with the sprockets. However, it is possible to prevent noodle lines from being wound at the sending end because no shaft is installed between the both side walls of the guide frame 72 if the right and left driven sprockets 74 at the sending end are independently supported by the both side walls of the guide frame 72 or they are removed so that the conveyer 71 will slide on the end of the guide frame 72.

Figure 11:
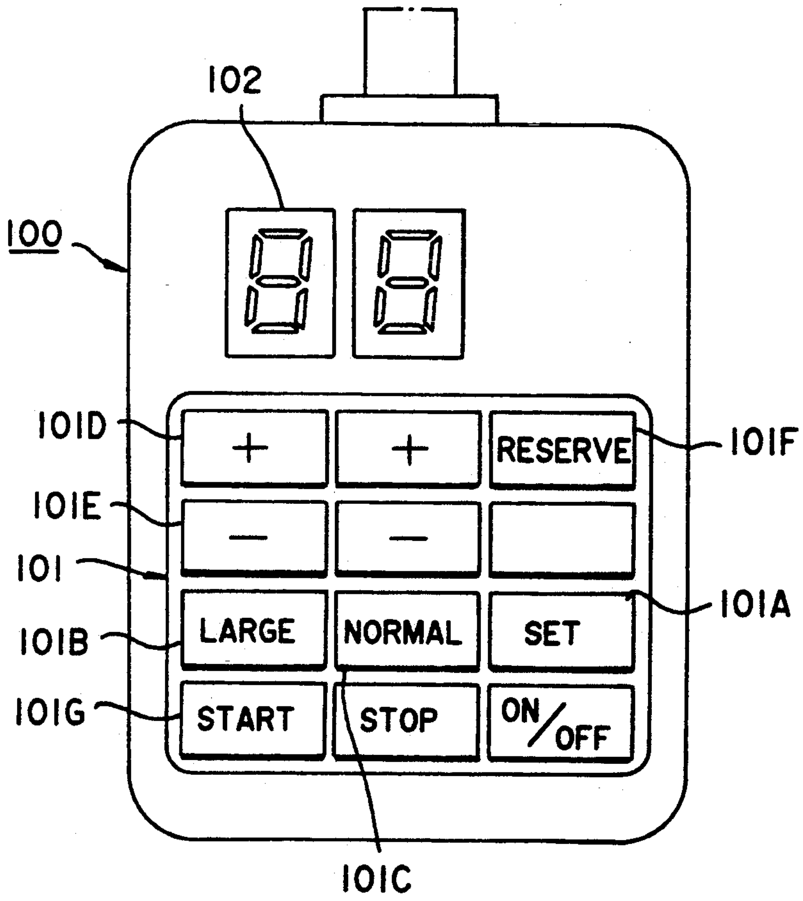
FIG. 11 is an explanatory drawing of the remote control panel used to control noodle quantity.

The remote control panel 100 shown in FIG. 11 is used to control the noodle quantity for one meal in the noodle making machine according to the present invention.

In this case, setting is previously made by selecting the driving motor 18 of the flour volumetric feeder 14 in said flour storing section 10 so that the feed quantity of the flour A for unit time will be constant or approx. 100 g of the flour A, for example, will be ejected for 5 sec.

Meanwhile, the flow rate of the flow regulator 93 of the water feeder 90 is previously set so that the feed quantity of the kneading water B will be constant or approx. 40 cc of the kneading water B, for example, will be fed for 5 sec.

Figure 12:
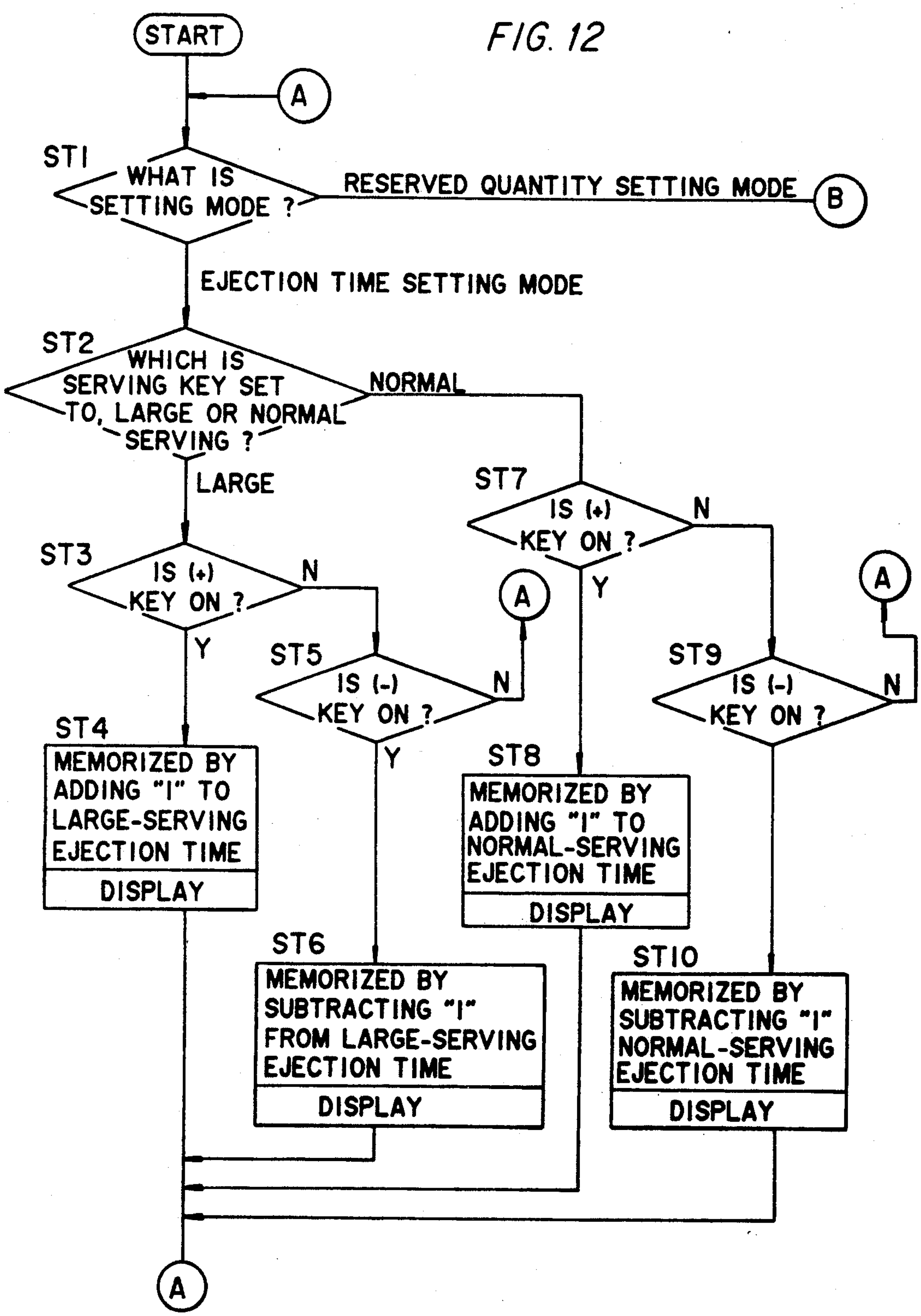
FIGS. 12, 13, and 14 (which is a symbolic joining of FIGS. 14A and 14B are flow charts showing the noodle quantity setting and noodle control state according to feed of flour and kneading water.
Figure 13:
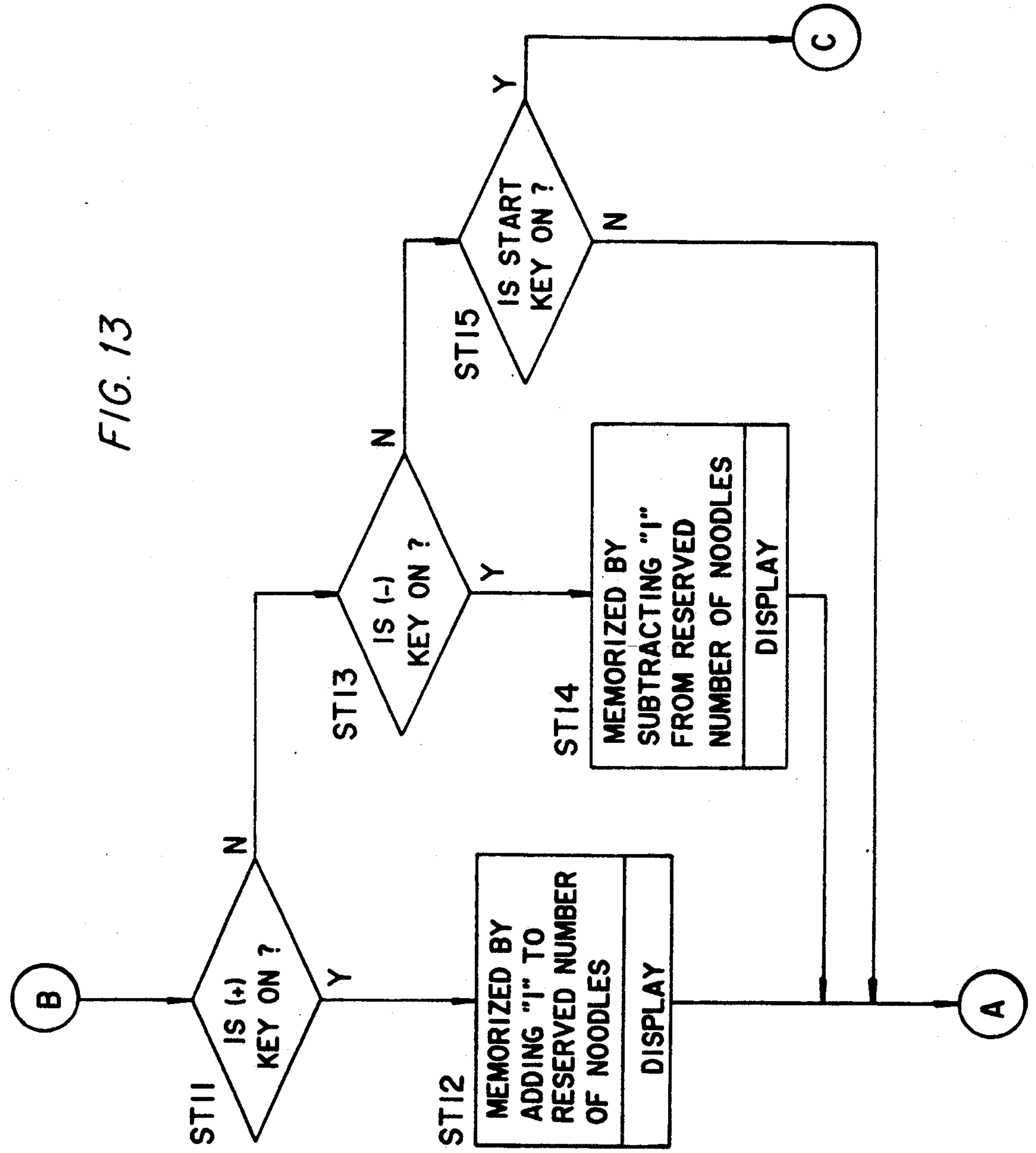
Figure 14:
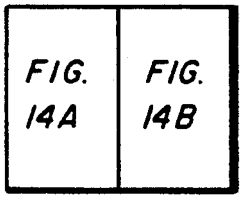
Figure 14A:
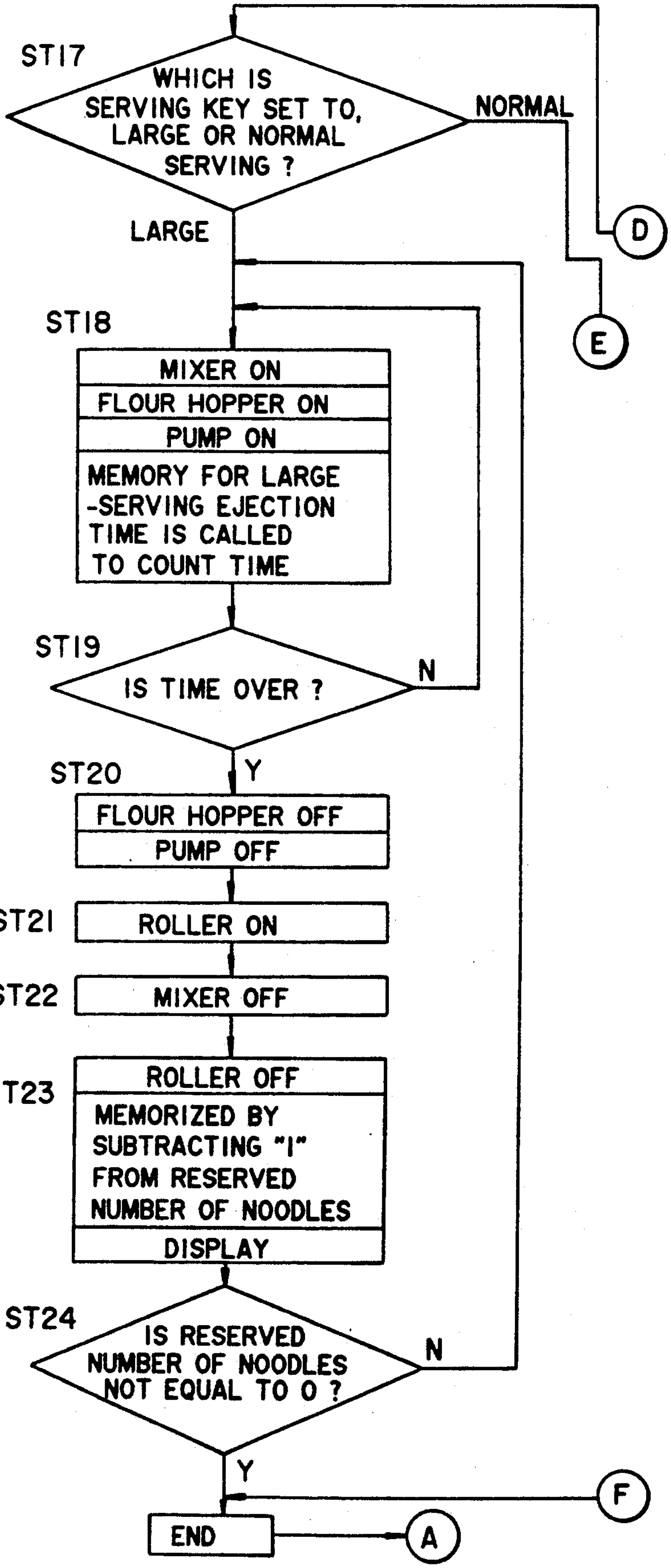
Figure 14B:
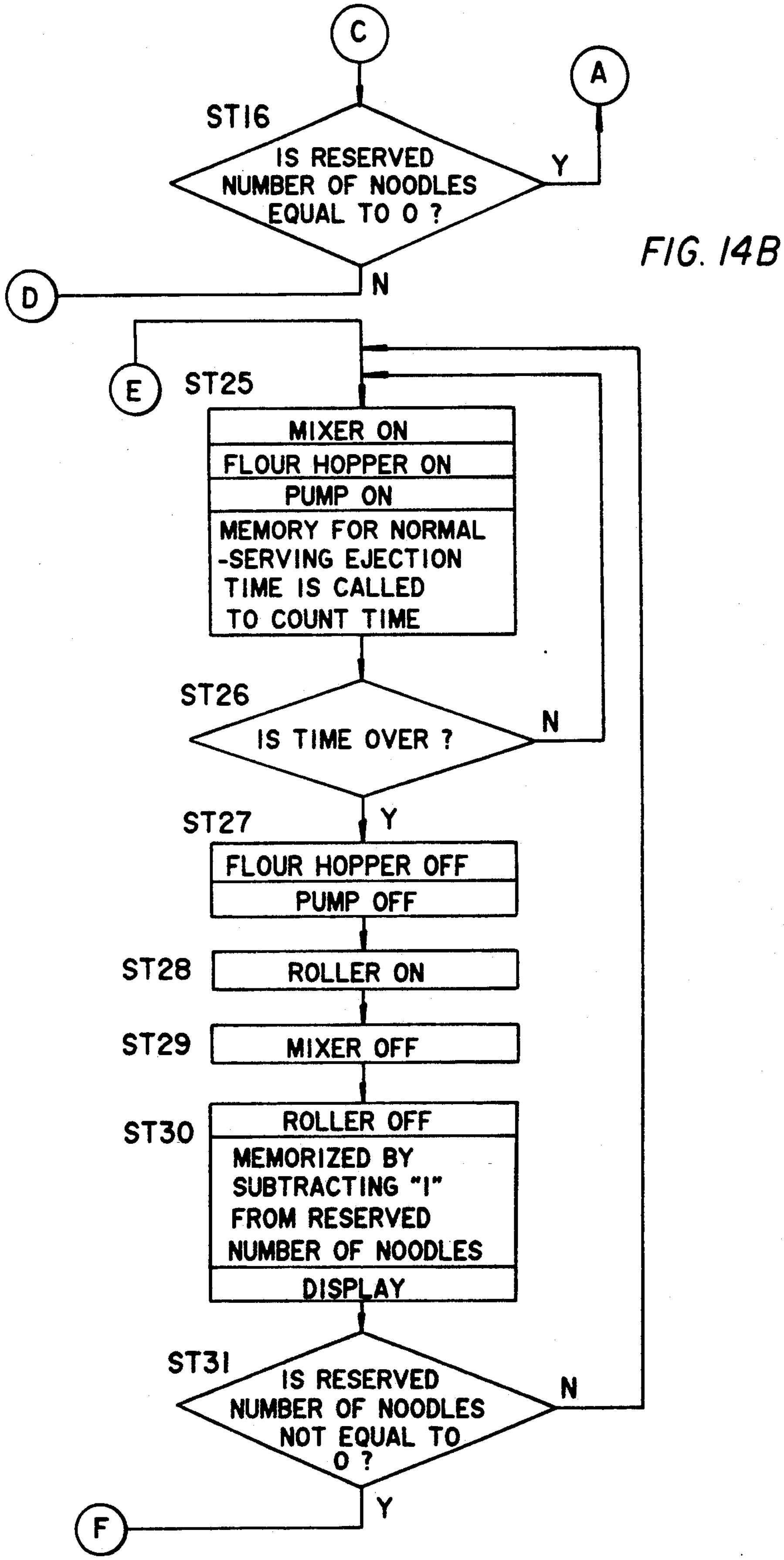

The noodle quantity control under the above setting conditions of the flour A and the kneading water B is executed according to the flow charts shown in FIGS. 12 and 13.

As shown in FIG. 12, to set the ejection times of the flour A and the kneading water B, the "flour quantity setting" button 101A at the operation section 101 on said remote control panel 100 is pressed at the step ST1, then the LED indicator 102 to display the ejection time in two digits flickers, the ejection time setting mode is ready, and the step ST2 starts.

In the step ST2, it is judged whether the serving key at said operation section 101 is set to "large serving" button 101B or "normal serving" button 101C. When the "large serving" button 101B is selected, if the (+) button 101D is pressed in the step ST3, data is memorized by adding "1" to "large-serving ejection time" in the step ST4 and displayed on the indicator 102 and the step moves to the state before ST1.

In this case, if it is judged that "normal serving" button 101C is selected in ST2, the step moves to ST7. If the (+) button 101D is pressed in ST7, data is memorized by adding "1" to "normal-serving ejection time" in ST8 and displayed on the indicator 102. If the (−) button 101E is pressed in ST9, data is memorized by subtracting "1" from "normal-serving ejection time" and displayed on the indicator 102. The flour ejection time can be changed by operating the (+) or (−) button.

When the ejection time and feed quantity of the flour A are set, the ejection time of the kneading water B is also set and the feed quantity is automatically set.

Meanwhile, to set the reserved number of noodles, the "reservation" button 101F at said operation section 101 is pressed in ST1 to prepare the "reservation quantity setting mode" before the (+) button 101D is pressed in ST11. Then, data is memorized by adding "1" to the "reserved number of noodles" in ST12, the reservation quantity is displayed on said indicator 102, and the step moves to the state before ST1. In this case, if the (−) button 101E is pressed in ST11 (ST13), data is memorized by subtracting "1" from "reserved number of noodles" and the reservation quantity is displayed on said indicator 102. The reserved number of noodles can be changed by operating the (+) or (−) button.

Thus, when the ejection times of the flour A and the kneading water B and the reserved number of noodles are set before the "start" key 101G at said operation section 100 is pressed in ST15, "reserved number of noodles" is checked in ST16 and "large serving" is checked in ST17. If "large serving" is set, the driving system of the mixer 20, the driving system 18 of the flour hopper (flour volumetric feeder 14 of the flour storing section 10), and the pump 91 of the water feeder 90 are turned on in ST18 and making of noodle base into noodles for one meal is executed by calling the memory for "large-serving ejection time" and counting the ejection time.

When the ejection time is over in ST19, that is, making of noodle base into noodles for one meal is completed, the driving system 18 of said flour hopper and the pump 90 are turned off in ST20 and the driving system 80 of the milling rollers 31 and 32 is turned on in ST21 before the driving system of the mixer 20 is turned off in ST22.

Then, after noodle base is formed into a noodle band by said milling rollers 31 and 32, the driving system 80 of the milling rollers 31 and 32 is turned off in ST23.

At the same time, data is memorized by subtracting "1" from "reserved number of noodles", the remaining reservation quantity is displayed on the indicator 102, and "reserved number of noodles" is detected in ST24. Thus, noodle making for one meal is repeated according to the reservation quantity. If "normal serving" is set in ST17, the driving system of the mixer 20, the driving system 18 of the flour hopper (flour volumetric feeder 14 of the flour storing section 10), and the pump 91 of the water feeder are turned on in ST25 and making of noodle base into noodles for one meal is executed by calling the memory for "large-serving ejection time" and counting the ejection time.

When the ejection time is over in ST26, that is, making of noodle base into noodles for one meal is completed, the driving system 18 of said flour hopper and the pump 90 are turned off in ST27 and the driving system 80 of the milling rollers 31 and 32 is turned off in ST28 before the driving system of the mixer 20 is turned off in ST29.

Then, after noodle base is formed into a noodle band by said milling rollers 31 and 32, the driving system 80 of the milling rollers 31 and 32 is turned off in ST30. At the same time, data is memorized by subtracting "1" from "reserved number of noodles", the remaining reservation quantity is displayed on the indicator 102, and "reserved number of noodles" is detected in ST31. Thus, making of "normal serving" noodles is repeated for each meal according to the reservation quantity.

In this case, if the feed quantity of the flour A is decreased, the quantity of the produced noodle base is also decreased and the length of the noodle band formed by the milling roller pair decreases. Therefore, the continuous noodle making time can be decreased by automatically controlling the rotating time of the milling roller pair according to the feed quantity of the flour A.

I claim:

1. In a noodle making machine, the improvement comprising:

- a flour storing means;
- a mixing means to form entangled noodle base by stirring the flour fed from the flour storing means together with kneading water;
- a water feeding means to feed kneading water to the mixing means; and
- a noodle-making control means to control the noodle quantity for each meal by keeping the feed quantities of said flour and kneading water for unit time constant and changing the feed times.

2. In a noodle making machine, the improvement comprising:

- a hopper to store fine particles such as flour;
- a base removably installed at the bottom of the hopper through a partition separating a top storing section from a bottom storing section; and
- a fine-particle volumetric feeder which is removably built in the base and quantitatively feeds the fine particles to the bottom storing section from said hopper through a plurality of openings in said partition, wherein said fine-particle volumetric feeder is removably assembled with:

a rotary plate having several protruded constant-volume measures to store a certain volume of fine particles to be fed to said bottom storing section on its circumference corresponding to the dropping port opened at the bottom of said base at an equal interval;

a rotary body having a plurality of rotary fingers protruding radially outwardly along the circumference of the rotary plate to synchronously rotate with the plate so that each finger will be located between said measures and driven by the motor installed at the bottom of said base; and a stirring body synchronously and rotatably installed at the top of the rotary body so that several stirring rods protruded on the top circumference of the rotary are disposed in the top storing section of the hopper through said partition.

3. A noodle making machine according to claim 2, further comprising a fine-particle control means to control the rotation of the rotary plate so that the fine particles stored in said measures will drop by their own weight from the dropping port according to the number of measures on said rotary plate corresponding to the dropping port.

4. A noodle making machine, comprising:

a flour storing means for supplying stored flour;

a mixing means for mixing the flour quantitatively supplied from the flour storing means with kneading water to produce entangled noodle base;

a milling means to form a noodle base by feeding the entangled noodle base produced through the mixing means to a pair of milling rollers to mill it;

an opening means to open a milling portion between a pair of milling rollers composing milling means in which a support shaft of one milling roller is supported by a fixed support frame and the other milling roller is supported by a rotary support frame installed so that it can be rotated in the direction in which the support frame separates from said one milling roller, by rotating the rotary support frame;

a cutting means to cut the noodle base milled by said milling means into noodle lines by a pair of cutting-edge rollers, and a sending means to send the noodle lines cut by the cutting means through a conveyer.

5. A noodle making machine according to claim 4, wherein said milling means has a means for pressing said pair of milling rollers together.

6. A noodle making machine according to claim 4 or 5, wherein said milling means has an adjusting means to adjust the thickness of a noodle band by an adjusting member to lock a rotary support frame with a locking level so that the lever can control the rotating range of said rotary support frame.

7. A noodle making machine according to claim 4 or 5, wherein said milling means is configured such that ends of first and second scrapers are pressed against a lower side of the milling portion of the milling roller pair respectively, and the end of the first scraper is set to a position close to said milling portion, and the end of the second scraper is set to a position lower than the end of the first scraper so that the ends of the first and second scrapers are asymmetric to a center shaft of said milling portion.

8. A noodle making machine according to claim 7, wherein each of said pair of milling rollers has a nitrided surface, and said first and second scrapers are made of stainless steel.

9. A noodle making machine according to claim 4, wherein said sending means includes an assembly comprising a guide frame, a conveyer aligned along the longitudinal direction of the guide frame, and a driving sprocket installed on one end or both ends in the longitudinal direction of the portion on the machine body where said guide frame is directly engaged with the conveyer for power transmission.

10. A noodle making machine according to claim 9, wherein the conveyer of said sending means is composed of an endless belt which includes a plurality of wires arranged at an interval equal to the pitch of said driving sprocket, and the guide wall is formed by folding the transverse both ends of each wire upward.

11. A noodle making machine according to claim 6, wherein said milling means is configured wherein ends of first and second scrapers are pressed against a lower side of the milling portion of the milling roller pair respectively, and the end of the first scraper is disposed at a position close to said milling portion and the end of the second scraper is set to a position lower than the end of the first scraper so that the ends of the first and second scrapers will be asymmetric to a center shaft of said milling portion.

* * * * *